US010769564B2

(12) United States Patent
Charles et al.

(10) Patent No.: US 10,769,564 B2
(45) Date of Patent: Sep. 8, 2020

(54) UNSCHEDULED BREAK COORDINATION SYSTEM

(71) Applicants: Sebastien Charles, Orange Park, FL (US); Jeffrey Carroll, Jacksonville, FL (US)

(72) Inventors: Sebastien Charles, Orange Park, FL (US); Jeffrey Carroll, Jacksonville, FL (US)

(*) Notice: Subject to any disclaimer, the term of this patent is extended or adjusted under 35 U.S.C. 154(b) by 109 days.

(21) Appl. No.: 16/035,195

(22) Filed: Jul. 13, 2018

(65) Prior Publication Data

US 2020/0019917 A1 Jan. 16, 2020

(51) Int. Cl.
*G06Q 10/06* (2012.01)
*H04W 4/33* (2018.01)
*H04W 4/12* (2009.01)

(52) U.S. Cl.
CPC ........... *G06Q 10/063116* (2013.01); *G06Q 10/063114* (2013.01); *H04W 4/12* (2013.01); *H04W 4/33* (2018.02)

(58) Field of Classification Search
CPC .............................................. G06Q 10/00–00
USPC .................................................. 705/7.11–7.42
See application file for complete search history.

(56) References Cited

U.S. PATENT DOCUMENTS

| 7,149,774 | B2* | 12/2006 | Zellner | G06Q 50/24 709/203 |
| 7,242,306 | B2* | 7/2007 | Wildman | G08B 13/2462 340/573.1 |
| 8,306,854 | B1* | 11/2012 | Bray | G06Q 10/0633 705/32 |
| 8,334,777 | B2* | 12/2012 | Wilson | G05B 19/042 340/286.07 |
| 8,761,375 | B1* | 6/2014 | Noble, Jr. | H04M 3/5175 379/265.04 |
| 9,164,656 | B1* | 10/2015 | Keller | G05B 19/41865 |
| 10,275,728 | B2* | 4/2019 | Makhoul | G06Q 10/06 |
| 10,496,927 | B2* | 12/2019 | Achin | G06N 5/04 |
| 2002/0163422 | A1* | 11/2002 | Eggers | H04L 29/06 340/7.29 |
| 2005/0033603 | A1* | 2/2005 | Suzuki | G06Q 50/22 705/2 |
| 2005/0177477 | A1* | 8/2005 | Arghavanifard | G06Q 10/1091 705/32 |
| 2006/0015763 | A1* | 1/2006 | Nakajima | H04L 67/02 714/4.1 |
| 2008/0126126 | A1* | 5/2008 | Ballai | G16H 40/20 705/2 |

(Continued)

OTHER PUBLICATIONS

Aronsky, Dominik, et al. "Supporting patient care in the emergency department with a computerized whiteboard system." Journal of the American Medical Informatics Association 15.2 (2008): 184-194. (Year: 2008).*

*Primary Examiner* — Alan S Miller

(74) *Attorney, Agent, or Firm* — Lawrence J. Gibney, Jr.

(57) ABSTRACT

This invention is a system for coordinating unscheduled breaks for employees within a facility. In many professions, personnel are required to be in a certain area or at a certain location, but will often have the need to take an unscheduled break. The employee or personnel will then only be able to take the unscheduled break if she or he can find a substitute to take her or his place during the break. The system described and claimed herein allows for real-time coordination of unscheduled breaks in a work setting.

16 Claims, 8 Drawing Sheets

(56) References Cited

U.S. PATENT DOCUMENTS

| | | | |
|---|---|---|---|
| 2008/0146258 A1* | 6/2008 | Testone | H04L 67/145 |
| | | | 455/466 |
| 2009/0175436 A1* | 7/2009 | Sarin | G06Q 10/00 |
| | | | 379/265.01 |
| 2009/0248551 A1* | 10/2009 | Taylor | G06Q 10/10 |
| | | | 705/32 |
| 2009/0248552 A1* | 10/2009 | Taylor | G06Q 10/1091 |
| | | | 705/32 |
| 2010/0063909 A1* | 3/2010 | Smith | G06Q 10/06 |
| | | | 705/32 |
| 2011/0137769 A1* | 6/2011 | Nielsen | G06Q 10/06 |
| | | | 705/32 |
| 2011/0205061 A1* | 8/2011 | Wilson | G05B 19/042 |
| | | | 340/573.1 |
| 2011/0208541 A1* | 8/2011 | Wilson | G06Q 50/22 |
| | | | 705/3 |
| 2014/0108023 A1* | 4/2014 | Arkoff | G06Q 10/06 |
| | | | 705/2 |
| 2014/0370989 A1* | 12/2014 | Acres | G07F 17/3234 |
| | | | 463/42 |
| 2015/0262112 A1* | 9/2015 | Raanan | G06Q 10/063114 |
| | | | 705/7.15 |
| 2015/0262312 A1* | 9/2015 | Raanan | G06Q 40/125 |
| | | | 705/32 |
| 2018/0211198 A1* | 7/2018 | Makhoul | H04W 28/06 |
| 2019/0394623 A1* | 12/2019 | Prencipe | H04W 4/21 |

* cited by examiner

UNSCHEDULED BREAK COORDINATION SYSTEM

BACKGROUND OF THE INVENTION

This invention relates to a system for providing unscheduled breaks for personnel or staff within a company. This invention specifically relates to industries where, personnel, faculty, or staff must be present in certain areas under certain circumstances within a facility. While the present invention is described as being used by anesthesiologists in a hospital, the present system may also be used other by medical related professions, the education and daycare industry, and the manufacturing industry.

A challenge facing the above-mentioned industries and others is the inability to efficiently communicate when an employee is taking an unscheduled break. An unscheduled break can include, but are not limited to, water breaks, bathroom breaks, lunch breaks, and snack breaks. Although there are mobile software applications that provide scheduling assistance, none assist with coordinating unscheduled breaks. Today anesthesiologists check on other anesthesiologists to see if he or she needs to be relieved for a break. The time it takes to find the other anesthesiologist is quite time consuming and inefficient. Furthermore, it is not uncommon for the anesthesiologist to be found only after she or he has already taken her or his break.

The present system involves a lead coordinator that manages a white board. The anesthesiologists working that day and their work location within a facility are designated on the white board. A primary job of the lead coordinator is to manage breaks for the anesthesiologists. The management of breaks can be complicated because while the lead coordinator has a general idea of where an anesthesiologist may be at a particular time, it is very common for the anesthesiologists to be running behind schedule due to previous procedures lasting longer than expected. Consequently, the anesthesiologist may be due to have a break but cannot leave because her or his patient is in an operating room ("OR"). Accordingly, if the anesthesiologist were to take a break, another anesthesiologist must be able to tend to the OR. Once an anesthesiologist is provided a break the lead coordinator marks that individual as having a break on the white board. It is not uncommon for the lead coordinator to find out that an anesthesiologist has had a break only after another anesthesiologist was sent to ask.

Furthermore, if the anesthesiologist were to need time for a restroom break or water break and her or his patient is still in the OR, then there is no system to request that another anesthesiologist be sent.

BRIEF SUMMARY OF THE INVENTION

The present invention provides a mobile software application that allows for real-time coordinating of late breaks and unscheduled breaks between individuals within a facility, identify the status of employees during unscheduled breaks, regardless if they are the ones providing the breaks, receiving the breaks, have had breaks or need breaks. Furthermore, the present invention can additionally be utilized for scheduled and unscheduled employee breaks. The present embodiments disclose how anesthesiologists can use the present invention in a hospital setting.

The system can be utilized on an electronic mobile device or electronic work station by anesthesiologists. The system will show which anesthesiologists are in the operating room ("OR"), on a break, or have a span of time between operations. An anesthesiologist that has a span of time between operations can access the system to view which other anesthesiologists may need a break and where the other anesthesiologists are located within the hospital. If another anesthesiologist has not taken a break, she or he can be relieved.

The system also allows for an anesthesiologist to request an unscheduled break, such as, but not limited to, a restroom break, water break, lunch break, or a snack break. This will allow another anesthesiologist to provide relief if she or he is able to.

In a second embodiment of the present invention this system allows a supervisor or lead coordinator to direct an employee to give another employee a break. Additionally, if an employee requests a break, the supervisor will then direct another employee to provide relief.

In a third embodiment of the present invention this system directs which employee should be relieved next. When an employee submits a request for a break, the system designates another individual or employee to provide relief.

It is anticipated that each of the three embodiments of the system can be further comprised of a plurality of sensors, which is provided throughout a facility in predetermined locations. The sensors operate in connection with the software system to determine when an individual or employee is in a particular location. Accordingly, the system reflects more accurate real time information with regard to employee location. In turn, the lead coordinator, employee or the system itself can efficiently determine which employee or individual should receive the next break.

DETAILED DESCRIPTION OF THE EMBODIMENTS

The present invention is an unscheduled break coordination system that allows for a team or set of individuals to coordinate unscheduled breaks throughout a work-day. Many industries require that a person be present at a particular time under various circumstances. For example, in the medical industry, anesthesiologists must be present while a patient is in the operating room; in the education industry, teachers must be present in the classroom when students or children are in the classroom; and in the manufacturing industry, a worker must be present while a particular machine is active. While there are other industries that require a worker to be physically present in a specific location for long periods of time, this application discusses the invention as it relates to anesthesiology in a hospital setting.

Figure 8:
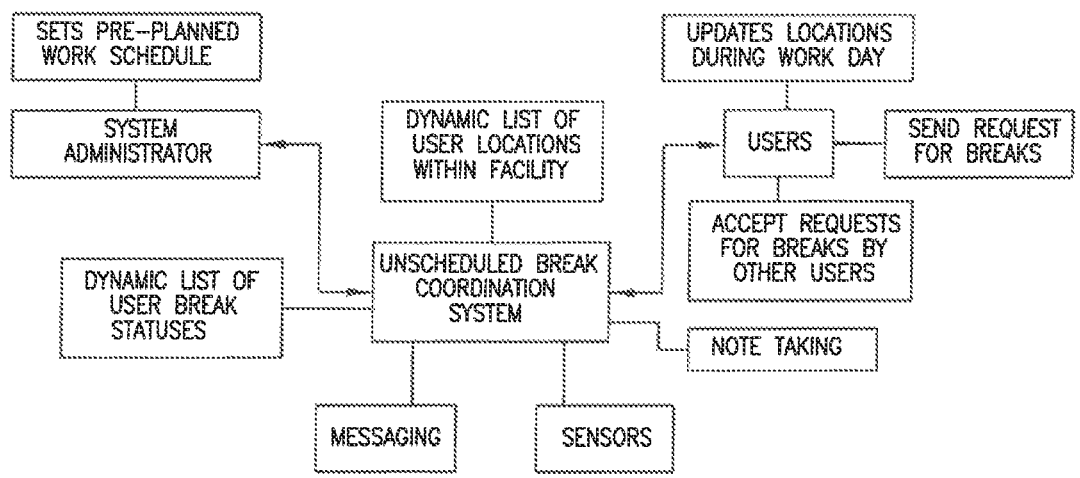
FIG. 8 is a diagram illustrating features and elements of the system wherein the system includes sensors.

This system is comprised of three separate embodiments. The first embodiment discloses a system where the set of individuals or anesthesiologists monitor themselves through the system. The second embodiment discloses a system wherein the set of individuals are monitored by a system administrator or lead coordinator. The third embodiment discloses a system wherein the set of individuals is monitored by the system itself with the use of a program controller. Each of the three embodiments can be further comprised of a plurality of sensors that is provided within the facility to which the users of the system are operating, which is shown in FIG. 8.

For purposes of this application the applicant will set forth an example that discusses an anesthesiologist in an operating room and how other anesthesiologists would employ this application.

A portable electronic device which can be either a phone of IPad as examples, is used by anesthesiologist A who is located in an operating room; an application is installed on the portable electronic device that integrates the software with all the other users that are logged into the system at that time. A white board on the application is displayed and shows the current status of each of the individual doctors' "break" status and current location for each doctor. In the situation when anesthesiologist A is in the operating room and needs a break, he or she can indicate through the application on his phone that a break is needed. Any other anesthesiologist who is on the system can respond to the request for the break; if anesthesiologist B is the first to respond that response will be communicated with all the other users so there is no duplication regarding responses. As part of the application anesthesiologist A can leave notes about the patient or the procedure for anesthesiologist B so that there is no delay in learning about the case and thus insure patient care and safety.

When anesthesiologist A is no longer in need of the break, he or she can then indicate on his phone that a break is no longer needed or that the break is over and can re-enter the operating room and take over from anesthesiologist B, if desired. Anesthesiologist A can also enter another operating room and relieve another doctor, if that is desired.

With this application a plurality of sensors on the phone can indicate the current status of a particular doctor's "break" status for each of the doctors who are using the system.

The system includes sensors configured to determine the proximity of a mobile device to one or more sensors. A primary function of embodiments of the sensors is to be able to capture a wide frequency range suitable to receive the transmit signals of the mobile devices in its proximity. The sensors have a preferably low-cost receiver capable of detecting RF energy, capturing the signal, and reducing the data size of the captured signal through filtering and decimation.

In certain embodiments, the Unscheduled Break Coordination system connects to a plurality of user interface devices over a Local Area Network (LAN) or a Wide Area Network (WAN) 110 via Transmission Control Protocol of the Internet Protocol Suite (TCP/IP). The interface devices 108 are distributed throughout a hospital's various individual care units and among the hospital staff.

Further, in certain embodiments Unscheduled Break Coordination system includes a plurality of interconnected servers or a plurality of services running on an individual server.

Therefore, the Unscheduled Break Coordination system communicates between the individual interface devices. This communication is facilitated over an extensible markup language (XML) interface hosted by the Unscheduled Break Coordination system that exchanges assignment information for staff assignments and device assignments such as on/off duty or on/off break for staff assignments or wireless handset, pager, or real time location badge assignments for device assignments. The user devices may include cellular phones, pagers, RFID badges, or any device that is capable of being associated with an individual staff member in both name and location. In certain embodiments, an individual staff member is assigned an interface device.

In general, many other embodiments of the user interface device may be used. The interface device includes one or more processors, memory, a network interface 206, one or more storage devices, a power source, one or more output devices, and one or more input devices. Each of the components including the processor, memory, network interface, storage device, power source, the output device, and the input devices are interconnected physically, communicatively, and/or operatively for inter-component communications.

The processor is configured to implement functionality and/or process instructions for execution within the user interface device. For example, the processor executes instructions stored in memory or instructions stored on a storage device. Memory, which may be a non-transient, computer-readable storage medium, is configured to store information within the user interface device during operation. In some embodiments, memory includes a temporary memory, an area for information not to be maintained when the interface device is turned off. Examples of such temporary memory include volatile memories such as random-access memories (RAM), dynamic random access memories (DRAM), and static random access memories (SRAM). Memory also maintains program instructions for execution by the processor.

The Storage device also includes one or more non-transient computer-readable storage media. The Storage device is generally configured to store larger amounts of information than memory. The Storage device may further be configured for long-term storage of information. In some examples, the Storage device includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The user interface device uses network interface to communicate with external devices via one or more networks such as one or more wireless networks, and other types of networks through which a communication with the interface device may be established. Network interface 206 may be a network interface card, such as an Ethernet card, an optical transceiver, a radio frequency transceiver, or any other type of device that can send and receive information. Other non-limiting examples of network interfaces include Bluetooth®, WiFi®, and USB.

The user interface device includes one or more user input devices. User input devices are configured to receive input from a user or a surrounding environment of the user through tactile, audio, and/or video feedback. Non-limiting examples of user input devices include a presence-sensitive screen, a mouse, a keyboard, a voice responsive system, video camera, microphone, optical sensor or any other type of input device. In some examples, a presence-sensitive screen includes a touch-sensitive screen.

One or more output devices are also included in the interface device. The Output devices are configured to provide output to a user using tactile, audio, and/or video stimuli. The Output device may include a display screen (part of the presence-sensitive screen), a sound card, a video graphics adapter card, or any other type of device for converting a signal into an appropriate form understandable to humans or machines. Additional examples of output device 214 include a speaker, a cathode ray tube (CRT) monitor, a liquid crystal display (LCD), or any other type of device that can generate intelligible output to a user.

The Unscheduled Break Coordination system server includes one or more processors, memory, a network interface, one or more storage devices, a user interface. In some embodiments, each of the components including the processor(s), the memory, the network interface, the storage device (s), and the UI, are interconnected physically, communicatively, and/or operatively for inter-component communications.

First Embodiment

This first embodiment is a software system that allows for coordination between individuals for unplanned breaks from work. The system provides a user interface that allows anesthesiologists to view where other anesthesiologists in a hospital or other medical facility are stationed during a particular time, request an unscheduled break, accept another's request for an unscheduled break, or reject another's request for an unscheduled break. While anesthesiologists attempt to plan a work day, operations and other medical related events occur that affect the preplanned schedule. Accordingly, anesthesiologists are forced to adjust their break schedule to their evolving daily work schedule.

Figure 1:
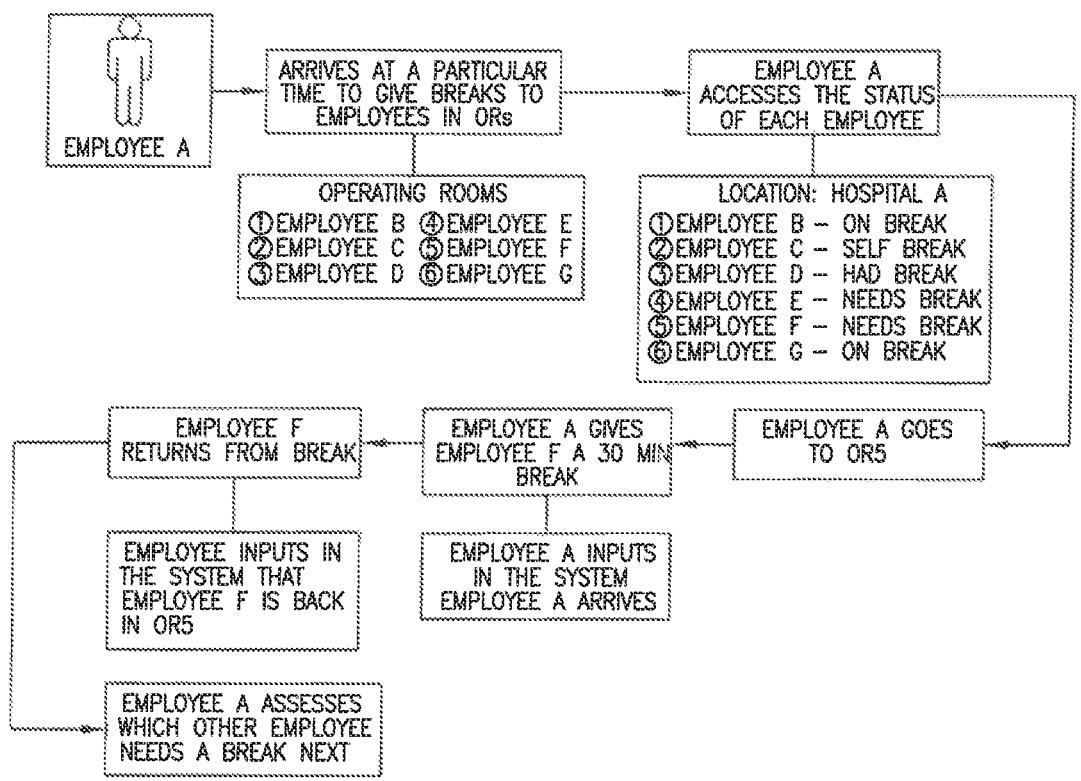
FIG. 1 is a diagram illustrating that an employee may view the status of the other employees through the system and determines which of the other employee should receive a break.

An example of the invention is shown in FIG. 1 where Employee A arrives to a particular point in her schedule to provide other anesthesiologists a break. She can access the system with an electronic mobile device, stationary electronic device or mobile workstation, to view which other employees are working, where those employees are located within a facility, and each employee's planned schedule. Thus, she can view at a particular point in time that Employee B is in operating room ("OR") 1, Employee C is in OR 2, Employee D is in OR 3, Employee E is in OR 4, Employee F is in OR 5, and Employee G is in OR 6.

Employee A can then view and assess the break status of each employee. In other words, Employee A can view which employees have taken a "self-break", are on break, was already provided a break, or in need of a break. In this first embodiment, the employee chooses who to provide a break to. In the example diagrammed in FIG. 1, Employee A provides a break to Employee F in OR 5. Although it is not shown in FIG. 1, Employee A can provide an estimated time of arrival to the Employee F.

Once Employee A arrives at OR 5, she is to input her arrival into the system. At that point, Employee F can provide Employee A with notes on the patient through the software system. This will help ensure a seamless transition between anesthesiologists. Employee F can then input into the system once returning from the break. Accordingly, Employee A can then send or share any patient notes with Employee F. Employee A can assess which other employee to provide a break to.

Figure 2:
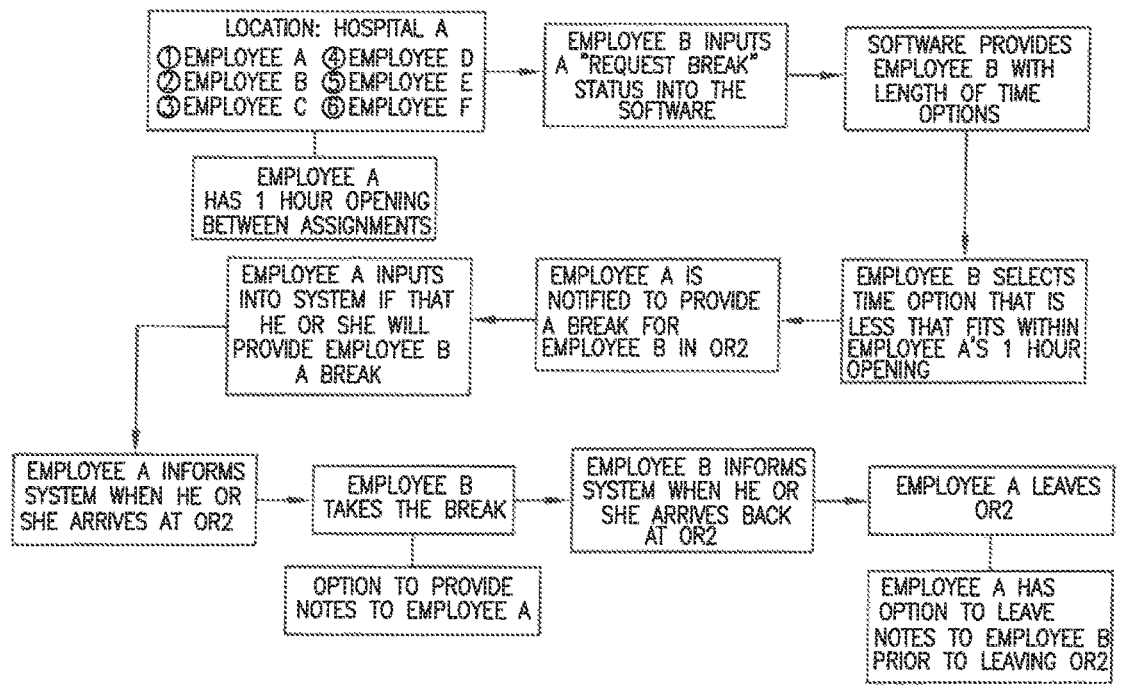
FIG. 2 is a diagram illustrating that an employee, shown as Employee B, may input a "request break" status into the software and another employee, Employee A, may input that the she or he can provide Employee B the break.

The system allows an employee to also request a break from another employee, which is shown in FIG. 2. When a break is requested by an employee, the system notifies other employees. The system can filter between employees to only notify those that are not in the middle of an operation. The other employees can then choose whether or not to provide the break. Once an employee agrees to provide the break, the other employees are then notified. This helps to prevent multiple employees from showing up to provide a break to the same employee at the same time.

As stated previously, the note sharing function is available to assist anesthesiologists to transition during a break seamlessly.

Second Embodiment

Figure 3:
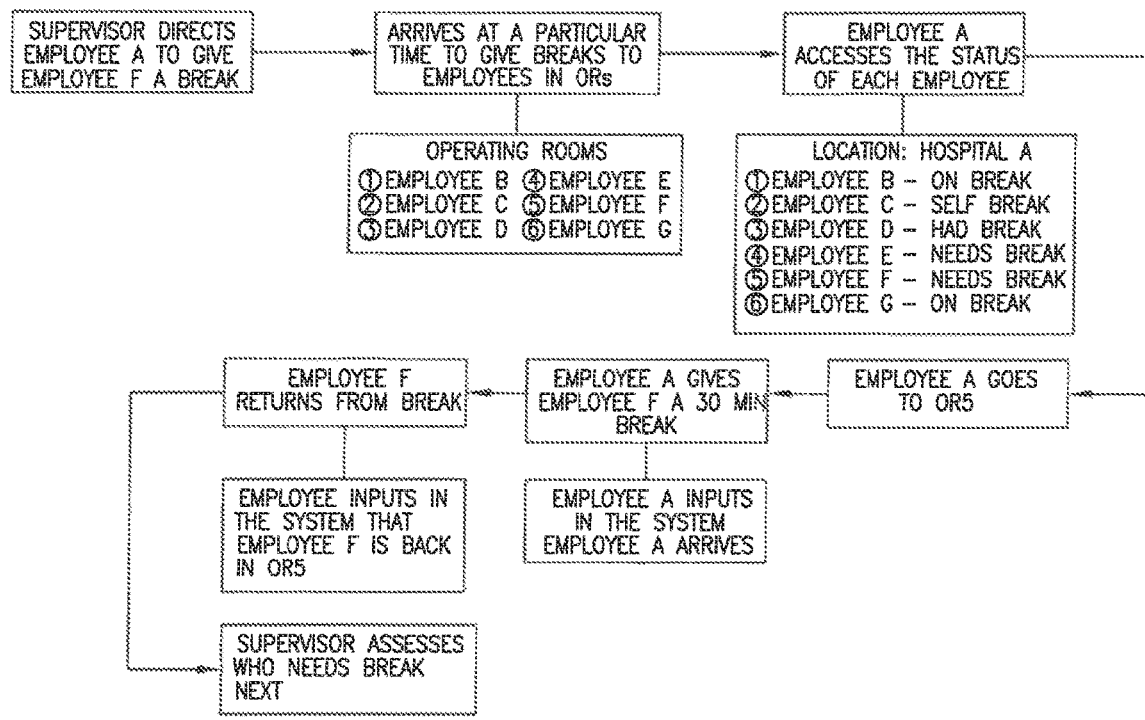
FIG. 3 is a diagram illustrating that a supervisor or lead coordinator may direct which employees should receive a break and also designates which employee should provide the break through the system.

This second embodiment is distinguished from the first embodiment because it allows for a system administrator, lead coordinator, or supervisor to determine which employee should receive a break at a particular point in time and which employee should provide another employee with a break. This embodiment is shown in FIG. 3 and FIG. 4.

A supervisor can utilize the system to view the break status of each employee as well as the schedule of each employee. The supervisor can then input a direction to an employee. For example, in FIG. 3, a supervisor directs Employee A to give Employee F a break at a particular time. Employee A can utilize the system to view where Employee F is in a facility. In this particular example Employee F is in OR 5. Employee A goes to attend OR 5 while Employee F takes a break.

Figure 4:
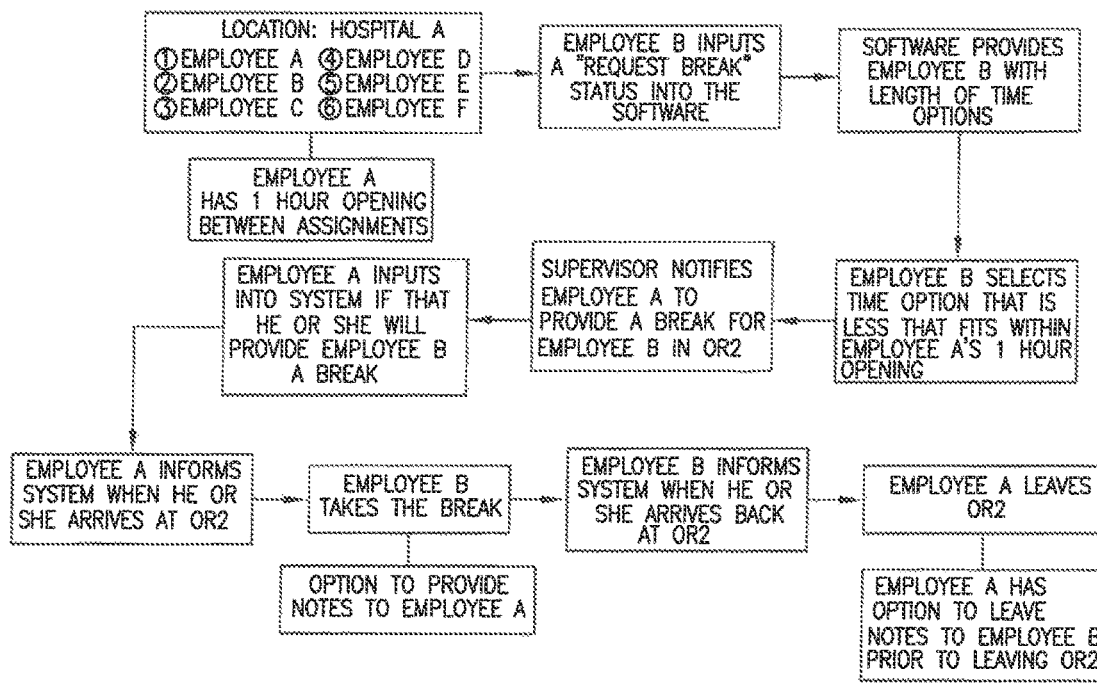
FIG. 4 is a diagram illustrating that Employee B may input a "request break" status into the software and the supervisor may direct another employee to provide Employee B with a break.
Figure 5:
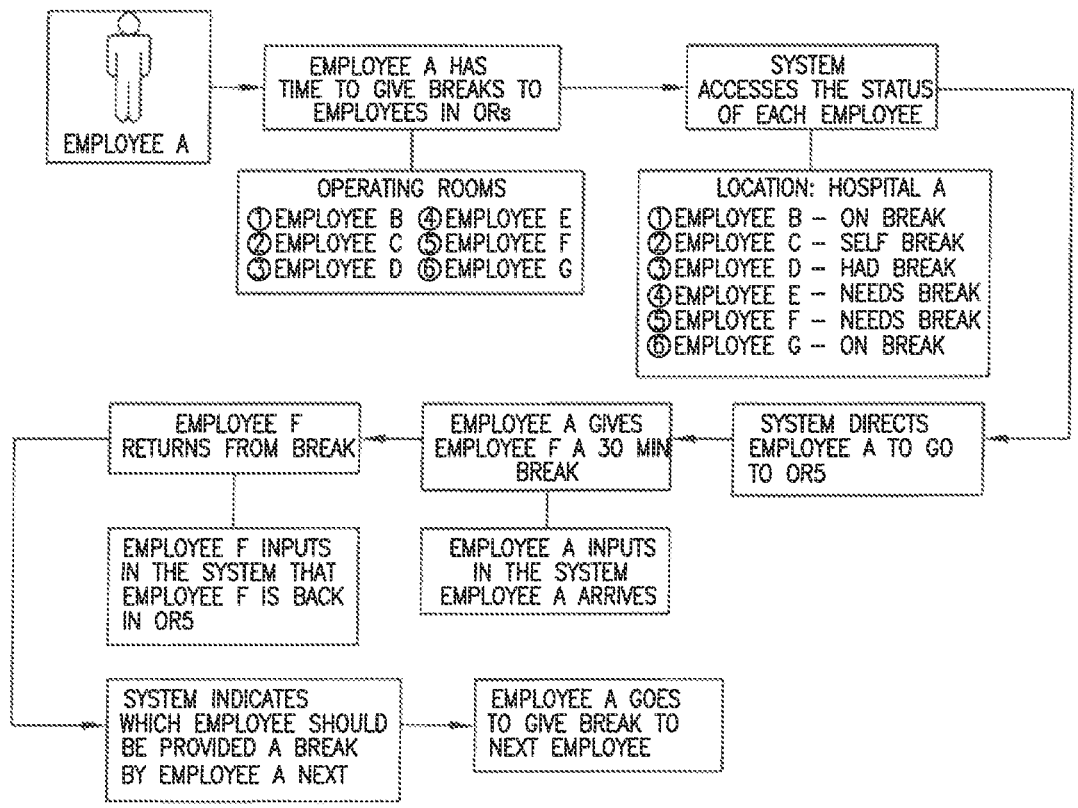
FIG. 5 is a diagram illustrating the system can determine which employee should receive a break.
Figure 6:
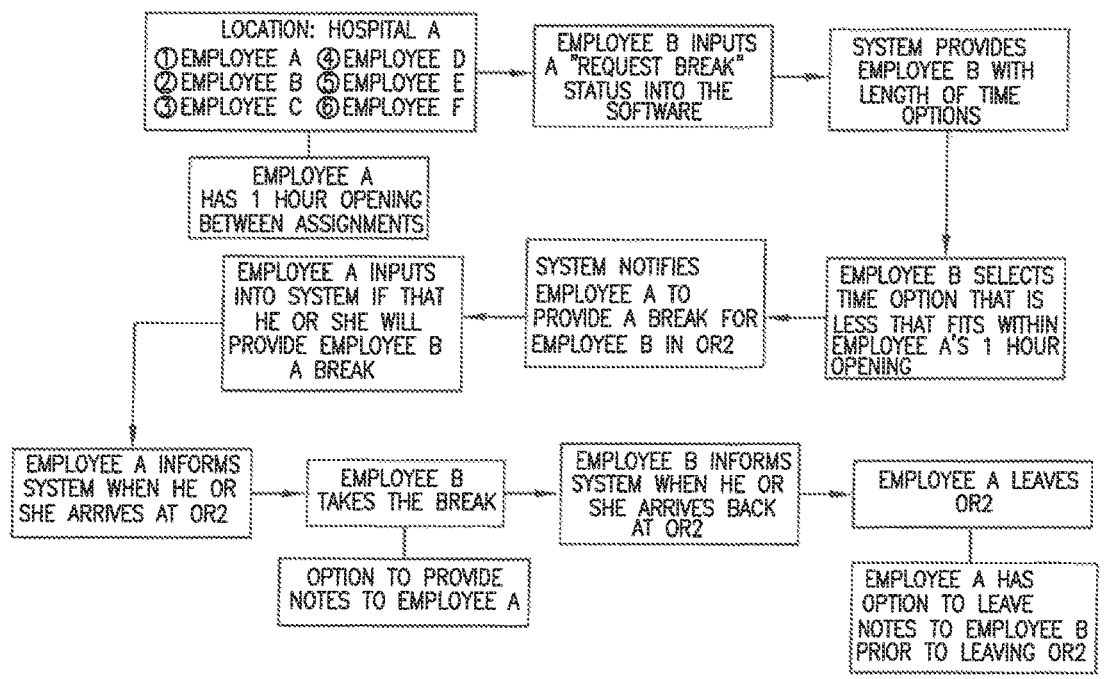
FIG. 6 is a diagram illustrating that Employee B may input a "requests break" status into the software and the system may direct another employee to provide Employee B with a break.
Figure 7:
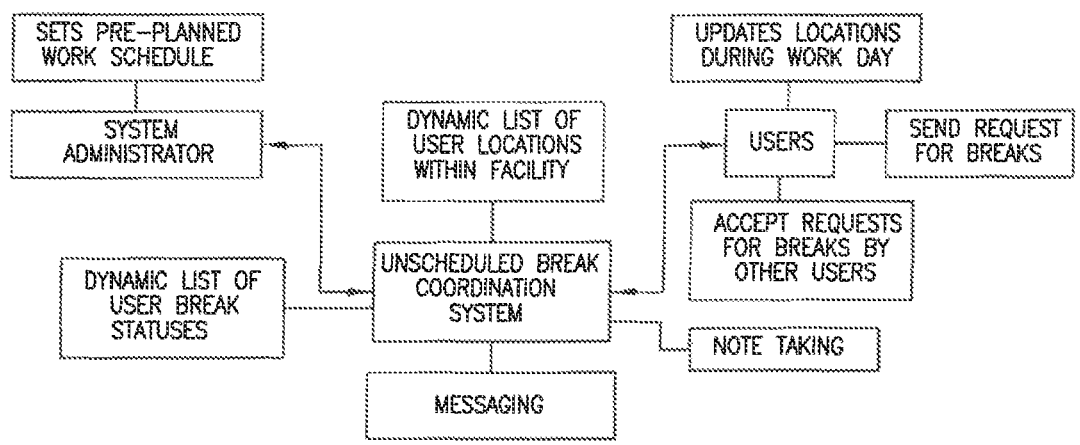
FIG. 7 is a diagram illustrating the features and elements of the system.

Similarly, in the event an employee requests a break, as shown in FIG. 4, the supervisor can direct another employee to provide the break. In FIG. 4, Employee A is directed to provide Employee F a break. Employee A can choose to accept the supervisor's direction or deny it. If the direction of the supervisor is accepted, then Employee A will view the location of Employee F and provide Employee F with a break.

Third Embodiment

This third embodiment allows the system to direct which employees should provide a break to another employee. In the event that an employee requests a break, the system would direct another employee to provide the break. This is distinguished from the other embodiments described herein because the system will monitor and direct the employees via a program controller. Accordingly, the facility and estimated travel time between locations within the facility can be uploaded and accessed by the program controller. Thus, when a first anesthesiologist has time between operations and a second anesthesiologist has requested a break, the system will direct the first anesthesiologist to provide a break to the second anesthesiologist.

In addition, the system can monitor the break status of each anesthesiologist. In other words, the system can monitor which anesthesiologists have taken a break and which anesthesiologists have not. When an anesthesiologist has time between operations or is otherwise free, the system will direct that anesthesiologist to relieve another anesthesiologist that has not had a break.

It is anticipated that estimated travel time for anesthesiologist can be taken into account when the system directs a break to be provided.

In each of the above embodiments it is critical that the anesthesiologists state when they take breaks and where they are located at a particular point in time. For example, if an anesthesiologist is entering an OR, then she or he should indicate so in the software system. If an anesthesiologist is taking a lunch break, then she or he should input that information into the software system. This in turn assists the system with accurately monitoring and sharing an anesthesiologist's break status at a particular point in time.

It is anticipated that each of the above described embodiments may be further comprised of a plurality of sensors. The sensors would be placed near the entry and exit point of areas commonly visited by anesthesiologists, such as operating rooms, cafeterias, break rooms, and the like. In turn, when an employee enters or leaves an OR, the sensor would input into the system that the employee has entered or left the room. Accordingly, that information would be displayed in real-time with the other set of individuals with the use of a program controller. This would help prevent user error in utilizing the system and increase efficiency in providing unscheduled breaks.

While the embodiments of the invention have been disclosed, certain modifications may be made by those skilled in the art to modify the invention without departing from the spirit of the invention.

The invention claimed is:

1. An unscheduled break coordination system, which is comprised of:
   a. one or more remote servers;
   b. a plurality of mobile electronic communication devices;
      wherein the plurality of mobile electronic communication devices provides a display;
   c. a web-based software;
      wherein the web-based software is provided on the plurality of mobile electronic communication devices;
      wherein the web-based software is wirelessly connected to the one or more remote servers with the plurality of mobile electronic communication devices;
      wherein the web-based software provides at least one user profile for each user;
      wherein each user profile provides a user status;
      wherein each user's status is further comprised of a location status and break status;
      wherein each user can modify the break status;
      wherein the user can modify the location status;
      wherein a request for a break can be sent from one user within the plurality of users to at least one other user within the plurality of users;
      wherein a user may accept another user's request for a break;
      wherein the web-based application software notifies other users of the system when a status is changed;
      wherein the web-based software notifies other users of the system when a request break button is engaged;
      wherein each profile displays the status of at least one other user of the system;
   d. a network;
      wherein the network provides communication between the users.

2. The unscheduled break coordination system as described in claim 1 wherein the break status indicates whether a break has been provided to the user, whether the user is on a break, or whether the user is in need of a break.

3. The unscheduled break coordination system as described in claim 1 wherein the plurality of users can be notified in real time of a break status modification.

4. The unscheduled break coordination system as described in claim 1 wherein the plurality of users can be notified in real time of a location status modification.

5. The unscheduled break coordination system as described in claim 1 wherein the web-based software provides for notetaking.

6. The unscheduled break coordination system as described in claim 1 wherein the web-based software provides for messaging between users.

7. The unscheduled break coordination system as described in claim 6 wherein the web-based software provides for messaging notes between users.

8. The unscheduled break coordination system as described in claim 1 wherein the web-based software provides a system administrator that operates as a lead coordinator for the one or more users.

9. An unscheduled break coordination system, which is comprised of:
   a. one or more remote servers;
   b. a plurality of mobile electronic communication devices;
      wherein the plurality of mobile electronic communication devices provide a display;
   c. a plurality of sensors;
      wherein the plurality of sensors is placed within a facility;
      wherein the plurality of sensors is connected to the server wirelessly;
      wherein the plurality of sensors detects the plurality of electronic communication devices;
   d. a web-based software;
      wherein the web-based software is provided on the plurality of mobile electronic communication devices;
      wherein the web-based software is wirelessly connected to the one or more remote servers with the plurality of mobile electronic communication devices;
      wherein the web-based software provides at least one user profile for each user;
      wherein each user profile provides a user status;
      wherein each user's status is further comprised of a location status and break status;
      wherein each user can modify the break status;
      wherein the user can modify the location status;
      wherein a request for a break can be sent from one user within the plurality of users to at least one other user within the plurality of users;
      wherein a user may accept another user's request for a break;
      wherein the web-based application software notifies other users of the system when a status is changed;
      wherein the web-based software notifies other users of the system when a request break button is engaged;
      wherein each profile displays the status of at least one other user of the system;
   e. a network;

wherein the network provides communication between the users.

10. The unscheduled break coordination system as described in claim 9 wherein the break status indicates whether a break has been provided to the user, whether the user is on a break, or whether the user is in need of a break.

11. The unscheduled break coordination system as described in claim 9 wherein the plurality of users can be notified in real time of a break status modification.

12. The unscheduled break coordination system as described in claim 9 wherein the plurality of users can be notified in real time of a location status modification.

13. The unscheduled break coordination system as described in claim 9 wherein the web-based software provides for notetaking.

14. The unscheduled break coordination system as described in claim 9 wherein the web-based software provides for messaging between users.

15. The unscheduled break coordination system as described in claim 14 wherein the web-based software provides for messaging notes between users.

16. The unscheduled break coordination system as described in claim 9 wherein the web-based software provides a system administrator that operates as a lead coordinator for the one or more users.

* * * * *